(12) United States Patent
Ziat

(10) Patent No.: US 9,537,858 B2
(45) Date of Patent: Jan. 3, 2017

(54) METHODS AND APPARATUS TO SUPPORT GLOBALPLATFORM™ USAGE ON AN EMBEDDED UICC (EUICC)

(71) Applicant: Apple Inc., Cupertino, CA (US)

(72) Inventor: Mehdi Ziat, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 14/500,912

(22) Filed: Sep. 29, 2014

(65) Prior Publication Data

US 2015/0334111 A1 Nov. 19, 2015

Related U.S. Application Data

(60) Provisional application No. 61/994,007, filed on May 15, 2014.

(51) Int. Cl.
*H04L 29/06* (2006.01)
*H04W 8/18* (2009.01)
(Continued)

(52) U.S. Cl.
CPC .......... *H04L 63/0853* (2013.01); *H04W 4/001* (2013.01); *H04W 4/003* (2013.01); *H04W 8/183* (2013.01); *H04W 12/08* (2013.01)

(58) Field of Classification Search
CPC .................................................... H04L 63/0853
See application file for complete search history.

(56) References Cited

U.S. PATENT DOCUMENTS

2007/0271598 A1* 11/2007 Chen ...................... H04W 12/06
726/4
2008/0220773 A1* 9/2008 Buckley ................ H04W 48/18
455/433

(Continued)

FOREIGN PATENT DOCUMENTS

EP 2731381 5/2014
KR 10-2013-0026958 3/2013

OTHER PUBLICATIONS

PCT Application No. PCT/US2015/026723—International Search Report and Written Opinion dated Jul. 30, 2015.

(Continued)

*Primary Examiner* — Hadi Armouche
*Assistant Examiner* — Ali Shayanfar
(74) *Attorney, Agent, or Firm* — Downey Brand LLP

(57) ABSTRACT

Disclosed herein is a technique for managing one or more electronic Subscriber Identity Modules (eSIMs) on an embedded UICC (eUICC). In particular, the technique involves leveraging the GlobalPlatform™ Specification and/or other telecommunication standards to support the eSIMs on the eUICC. Each eUICC can include an Issuer Security Domain (ISD) owned by a device manufacturer and an eSIM manager that manages the plurality of eSIMs on the eUICC. Notably, binaries of one or more applications shared between different eSIMs can be standardized and stored in a manner that enables each eSIM to utilize the one or more applications (via the eSIM manager) without needing to individually store the binaries. Using this approach, the overall size and complexity of each eSIM can be reduced, which can increase the amount of available memory within the eUICC as well as the overall performance of the eUICC.

20 Claims, 7 Drawing Sheets

(51) Int. Cl.
*H04W 4/00* (2009.01)
*H04W 12/08* (2009.01)

(56) References Cited

U.S. PATENT DOCUMENTS

| | | | |
|---|---|---|---|
| 2008/0261655 A1* | 10/2008 | Carpenter | H04W 48/18 455/558 |
| 2012/0108206 A1* | 5/2012 | Haggerty | H04W 12/06 455/411 |
| 2012/0130838 A1 | 5/2012 | Koh et al. | |
| 2012/0135710 A1* | 5/2012 | Schell | G06F 12/0246 455/411 |
| 2012/0331292 A1 | 12/2012 | Haggerty et al. | |
| 2013/0042025 A1* | 2/2013 | Ennesser | G06F 13/102 710/5 |
| 2013/0227646 A1 | 8/2013 | Haggerty et al. | |
| 2013/0331063 A1* | 12/2013 | Cormier | H04L 63/0272 455/411 |
| 2014/0073375 A1* | 3/2014 | Li | H04W 4/001 455/558 |
| 2014/0130035 A1* | 5/2014 | Desai | G06F 8/65 717/172 |
| 2014/0134981 A1 | 5/2014 | Park et al. | |
| 2014/0143108 A1* | 5/2014 | Smith | G06Q 20/3229 705/35 |
| 2014/0189880 A1* | 7/2014 | Funk | G06F 21/62 726/27 |
| 2014/0235210 A1* | 8/2014 | Park | H04W 12/04 455/411 |
| 2014/0237101 A1* | 8/2014 | Park | H04L 67/303 709/223 |
| 2014/0287725 A1* | 9/2014 | Lee | H04W 12/06 455/411 |
| 2014/0308991 A1* | 10/2014 | Lee | H04W 8/183 455/558 |
| 2014/0329502 A1* | 11/2014 | Lee | H04W 12/06 455/411 |
| 2014/0335847 A1* | 11/2014 | Maunier | H04L 41/0853 455/419 |
| 2016/0149903 A1* | 5/2016 | Suh | H04L 63/0428 713/156 |

OTHER PUBLICATIONS

Smart Cards; Remote APDU structure for UICC based applications (Release 11), ETSI TS 102 226 v11.2.0 (Jan. 2013).
Taiwan Application No. 104115443 Office Action and Search Report Dated Aug. 1, 2016.

* cited by examiner

METHODS AND APPARATUS TO SUPPORT GLOBALPLATFORM™ USAGE ON AN EMBEDDED UICC (EUICC)

CROSS-REFERENCE TO RELATED APPLICATIONS

The present application claims the benefit of U.S. Provisional Application No. 61/994,007, entitled "METHODS AND APPARATUS TO SUPPORT GLOBALPLATFORM USAGE ON AN EMBEDDED UICC" filed May 15, 2014, the content of which is incorporated herein by reference in its entirety for all purposes.

FIELD

The described embodiments set forth a technique for leveraging and combining the GlobalPlatform™ Specification and other telecommunication standards to support embedded Universal Integrated Circuit Cards (eUICCs).

BACKGROUND

Most wireless communication devices (e.g., smart phones) are configured to utilize Universal Integrated Circuit Cards (UICCs) that provide access to wireless network services. A UICC typically takes the form of a small removable card (e.g., a Subscriber Identity Module (SIM) card) that is inserted into a wireless communication device. In most cases, each UICC is associated with a single "Issuer"—such as a mobile network operator—that controls the programming and distribution of the UICC. A popular standard, known as the GlobalPlatform™ Specification, has been adopted by a majority of mobile network operators, and facilitates secure and interoperable management of applications on UICCs.

In more recent implementations, non-removable UICCs—referred to herein as embedded UICCs (eUICCs)—are being included on system boards of wireless communication devices. These eUICCs are distinct from the traditional removable UICCs in that the eUICCs are non-removable and soldered to the system boards of wireless communication devices. In order to transition from use of a UICC to an eUICC in a wireless communication device, software embedded in the UICC may need to be completely re-written/re-programmed with new functions and/or applications in order to accommodate this significant change in hardware configuration, which can prove costly and time consuming. Thus, there exists a need for a more streamlined approach to transition from using UICCs to eUICCs.

SUMMARY

Representative embodiments set forth herein disclose various techniques for managing one or more electronic Subscriber Identity Modules (eSIMs) on an embedded UICC (eUICC). In particular, the techniques involve leveraging the GlobalPlatform™ Specification and/or other telecommunication standards to support the eSIMs on the eUICC.

An eUICC includes an Issuer Security Domain (ISD) owned by a device manufacturer and an eSIM manager that manages a plurality of eSIMs that are stored on the eUICC. Each eSIM includes (i) a security domain associated with a corresponding mobile network operator, (ii) multiple applications associated with the mobile network operator and/or third-party service providers, and (iii) binary packages associated with the applications, in some embodiments. One or more of the applications are standardized, in some embodiments, such that each eSIM can use the standardized applications and associated standardized binary packages. In this manner, it is not necessary to store binary packages for the standardized applications on each eSIM managed by the eUICC. One or more of the applications are merged functionally with security domains of the eSIMs in order to incorporate the merged applications within the GlobalPlatform™ Specification framework. This functional merging suppresses the need to individually store binary packages of the applications for each eSIM on the UICC or to instantiate the applications on each eSIM, thereby reducing the size of the eSIMs. By leveraging the GlobalPlatform™ Specification and/or other telecommunication standards, a smooth, cost effective, and quick transition from removable UICCs to eUICCs can be achieved.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that can be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
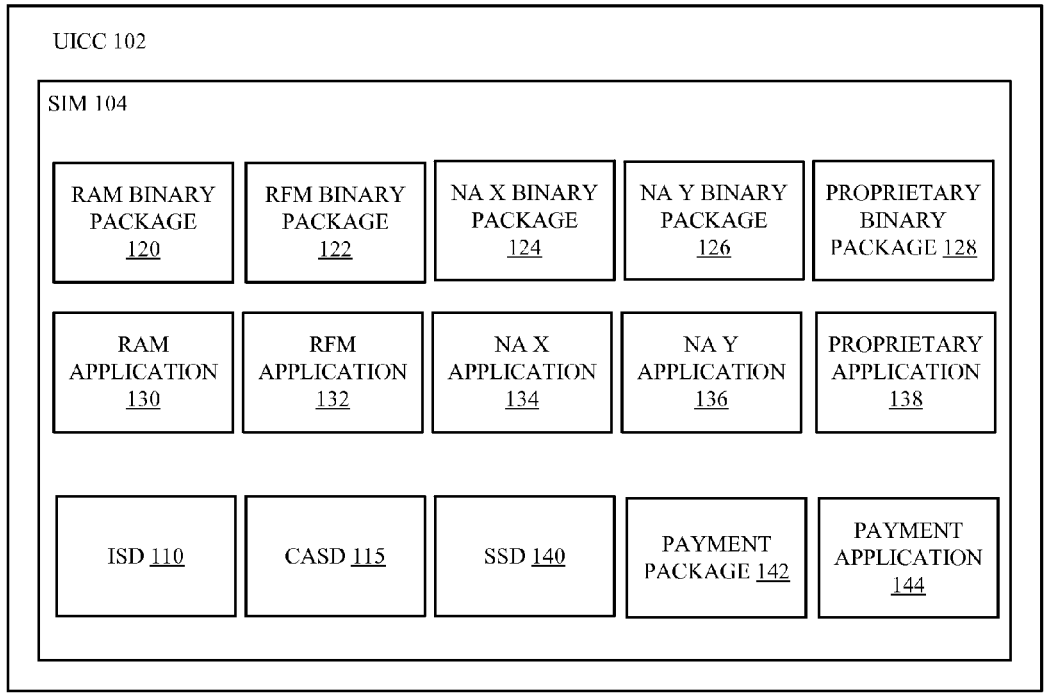
FIG. 1 illustrates architecture of a typical UICC.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The GlobalPlatform™ Specification is an association of industry partners that develop specifications for management of multiple applications on UICCs (e.g., removable UICCs) that are included in wireless communication devices. Typically, under the GlobalPlatform™ Specification, each UICC can include, among other components, (i) a remote application management (RAM) application that allows an Issuer (such as a mobile network operator) to remotely manage the applications on the UICC, (ii) a remote file management (RFM) application that allows the Issuer to remotely manage one or more files on the UICC, and (iii) one or more network access (NA) applications associated with one or more wireless networks. The UICC can also include one or more proprietary applications associated with an Issuer, as well as one or more third-party applications hosted by the Issuer. The UICC can further include binary packages associated with the RAM application, the RFM application, each of the NA applications, and each of the proprietary applications.

The GlobalPlatform™ Specification also offers security services to applications on the UICC via standardized applications called security domains. The security domains on the UICC include an Issuer Security Domain (ISD), a Controlling Authority Security Domain (CASD), and a Supplemental Security Domain (SSD). Each security domain holds a set of cryptographic keys facilitating secure communication with an owner of the security domain (e.g., via a server associated with the owner). For example, the ISD can hold a set of cryptographic keys associated with the Issuer that facilitate secure communication with an Issuer's server, while the SSD (owned by a third-party service provider) holds a set of cryptographic keys associated with the third-party service provider that facilitate secure communication with a third-party server, and so on.

In order to transition from removable UICCs to non-removable UICCs (i.e., eUICCs), the software and/or firmware of the UICCs may need to be completely re-written/re-programmed with new functions and/or applications, which can prove costly and time consuming. In view of the foregoing deficiencies, the embodiments described herein provide techniques that leverage the GlobalPlatform™ Specification and/or other telecommunication standards to enable a smooth transition from use of removable UICCs to eUICCs to reduce development time for vendors to transition to implementing eUICCs.

In particular, the techniques set forth herein leverage the GlobalPlatform™ Specification and/or other telecommunication standards to support a plurality of electronic Subscriber Identity Modules (eSIMs) on the same eUICC. According to one embodiment, and to achieve the foregoing techniques, the eUICC includes an ISD owned by a device manufacturer and an eSIM manager that manages the plurality of eSIMs on the eUICC. Each eSIM can include (i) a security domain associated with a mobile network operator that corresponds to the eSIM, (ii) multiple applications associated with the mobile network operator and/or third-party service providers, and (iii) binary packages associated with the applications.

Storing binary packages for the multiple applications associated with each of the eSIMs can result in considerable memory consumption within the eUICC. It is therefore desirable to reduce the size of the eSIMs so that less memory is consumed. Such an approach can provide the benefit of, for example, more rapid loading of eSIMs onto the eUICC (e.g., when a new subscription is desired), and enabling more eSIMs to be stored within the eUICC. According to one embodiment, the RAM application, the RFM application, and the NA applications are standardized such that each eSIM utilizes standardized applications and associated standardized binary packages. This approach can eliminate the need to individually store binary packages for the standardized applications on each eSIM managed by the eUICC. According to one embodiment, the standardized binary packages are stored in a specific area of memory within the eUICC accessible by the eSIM manager. According this approach, each eSIM is reduced to storing binary packages associated with proprietary (i.e., non-standardized) applications. In this manner, each eSIM can access the remotely-stored standardized packages as well as the locally-stored proprietary packages when the eSIM is activated.

In addition to the foregoing, functions belonging to the RAM application and RFM application can be merged with the functions of security domains of the eSIMs in order to incorporate the functions of the RAM and RFM applications within the GlobalPlatform™ Specification framework. This approach can eliminate the need to store binary packages for the RAM application and the RFM application on the eUICC, and can also eliminate the need to instantiate the RAM and RFM applications on each eSIM, thereby reducing the size of the eSIMs.

Accordingly, the techniques described herein provide for managing multiple eSIMs on a eUICC by leveraging the GlobalPlatform™ Specification and/or other telecommunication standards. A more detailed discussion of these techniques is set forth below and described in conjunction with FIGS. 1-7, which illustrate detailed diagrams of systems and methods that can be used to implement these techniques.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11 ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 illustrates an architecture of a typical UICC 102 (for example, a removable UICC) that can be included a user equipment (UE) (for example, a wireless communication device). The UE can include a SIM (Subscriber Identity Module)/USIM (Universal Subscriber Identity Module) 104 that is a logical software entity that is stored and executed from the UICC 102. In particular, the SIM 104 can store subscriber information, as well as keys and algorithms used for authentication with a mobile network operator, in order to obtain wireless network services provided by the mobile network operator. The SIM software can based on a variety of software platforms, e.g., the Java Card™ programming language. Using the Java Card™ programming language, the SIM 104 can include a plurality of Java-based applications that securely run on the UICC 102.

Per the GlobalPlatform™ Specification, SIM 104 can include, among other components, a remote application management (RAM) application 130 that allows an Issuer (such as a mobile network operator) to remotely manage the applications on the UICC 102, a remote file management (RFM) application 132 that allows the Issuer to remotely manage one or more files on the UICC 102, and one or more network access (NA) applications 134, 136 associated with one or more wireless networks (for example, a first NA application associated with a GSM network, a second NA application associated with a UMTS network, and/or other NA applications associated with other wireless networks). The SIM 104 can also include one or more proprietary applications 138 associated with an Issuer, as well as one or more third-party applications 144 (for example, transit applications, payment applications, banking applications, etc.) provided by third-party service providers and hosted by the Issuer. SIM 104 can further include binary packages 120, 122, 124/126, and 128 associated with the RAM application, the RFM application, each of the NA applications, and each of the proprietary applications, respectively. Although not illustrated in FIG. 1, the binary packages can include files, directories, and/or scripts necessary for instantiation of the applications on the UICC 102.

The GlobalPlatform™ Specification also offers security services to the applications on the UICC 102 via standardized applications called security domains. A security domain establishes a secure channel between applications in the UICC (applications assigned to/associated with the security domain) and external entities (i.e., entities external to the UICC, for example, mobile network operators, third-party service providers, etc.). The security domains on the UICC 102 include an Issuer Security Domain (ISD) 110, a Controlling Authority Security Domain (CASD) 115, and/or a Supplemental Security Domain (SSD) 140. Each security domain holds a set of cryptographic keys facilitating secure communication with an owner (i.e., a server associated with the owner) of the security domain. For example, the ISD 110 holds a set of cryptographic keys associated with the Issuer (i.e., mobile network operator) that facilitate secure communication with an Issuer server in order to authenticate with the Issuer, the SSD 140 (owned by a third-party service provider that provides third-party applications such as payment application 144 and associated payment binary package 142) holds a set of cryptographic keys associated with the third-party service provider that facilitate secure communication with a third-party server, and so on.

Typically, the UICC 102 is programmed with a single SIM 104 that is associated with a single Issuer (i.e., mobile network operator) that controls the programming and distribution of the UICC 102. In contrast, according to one embodiment, a secure element (for example, an embedded UICC (eUICC)) can be configured to store one or more electronic Subscriber Identity Modules (eSIMs). Each eSIM is a software emulation of a typical SIM/USIM and contains analogous application and subscriber/user data. Each eSIM can be associated with a different mobile network operator, thereby enabling a mobile device in which the eSIMs are included to authenticate with a number of different mobile network operators.

Figure 2:
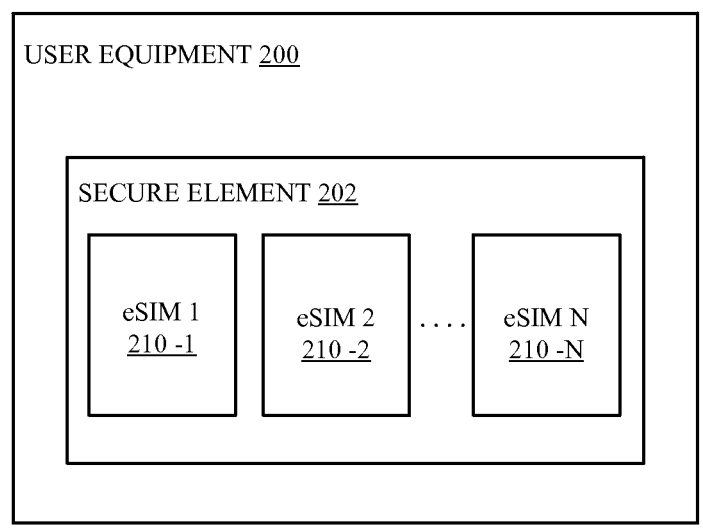
FIG. 2 illustrates a block diagram of particular components of a user equipment device including a secure element, according to some embodiments.

FIG. 2 illustrates a user equipment UE 200 including a secure element 202, which, according to one embodiment, represents an eUICC that is embedded within a main system board of the UE 200. According to one embodiment, the secure element 202 is configured to be a sandboxed hardware/software environment that cannot be directly accessed by external entities, such as a main operating system (OS) that is executing on the UE 200. The secure element 202 is configured to store an ISD (Issuer Security Domain) associated with a device manufacturer, an eSIM manager, and a plurality of eSIMs 210-1, 210-2, . . . , 210-N managed by the eSIM manager. Although not illustrated in FIG. 2, the secure element 202 can include a microprocessor and a storage device that contains computer-executable instructions that, when executed by the microprocessor, cause the microprocessor to perform the various operations described herein. The UE 200 can represent a mobile computing device, for example, a smart phone, a tablet device, a laptop computer, and the like.

Figure 3:
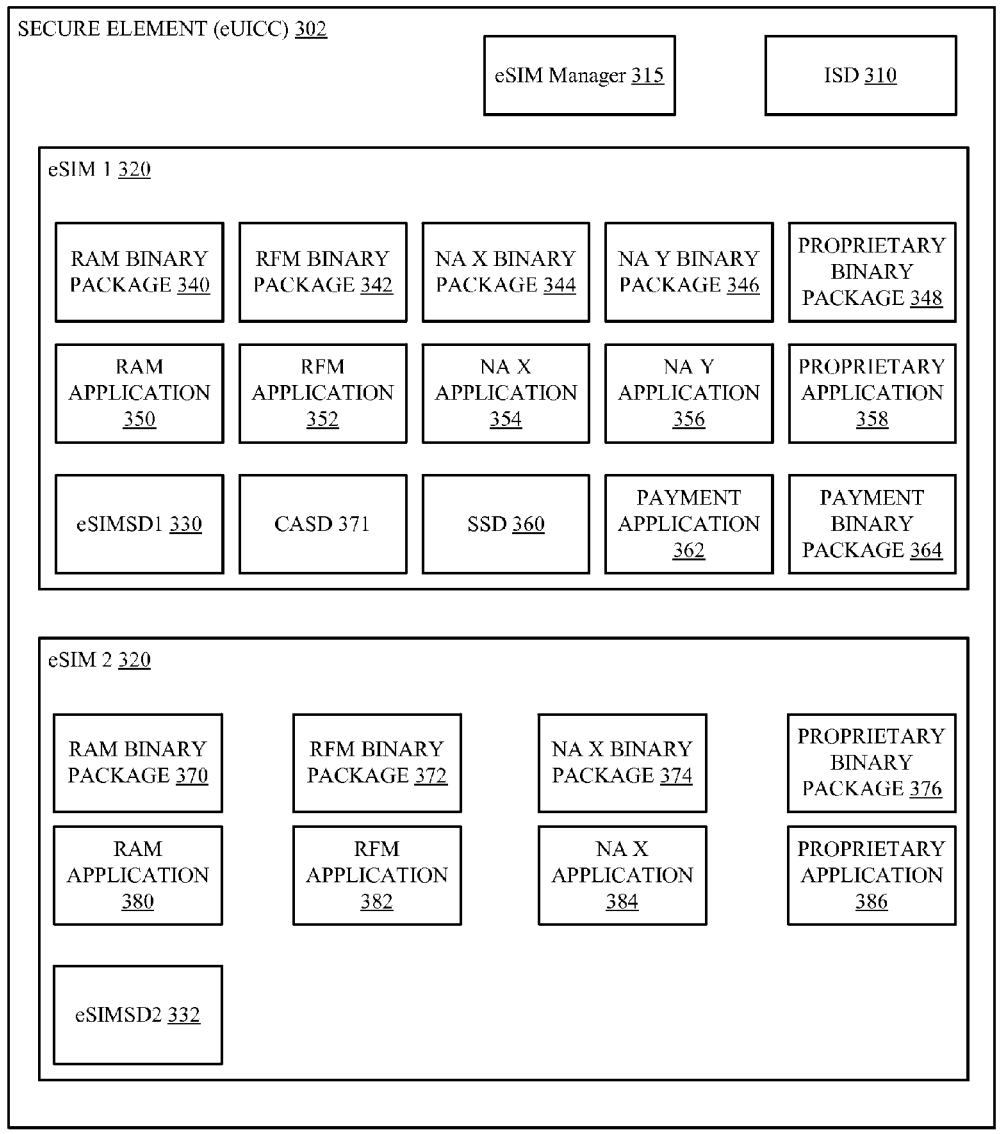
FIGS. 3-5 illustrate exemplary architectures of secure elements, according to some embodiments.

FIG. 3 illustrates an exemplary architecture of a secure element (e.g., eUICC), according to one embodiment. As shown in FIG. 3, the secure element 302, according to the exemplary architecture, includes two eSIMs 320, 322. While FIG. 3 depicts two eSIMs contained within the secure element, any number of eSIMs can be managed by the secure element without departing from the scope of this disclosure. As previously noted, the embodiments set forth herein involve leveraging the GlobalPlatform™ Specification framework to 1) support the management (e.g., loading, installation, deletion, lifecycle) of applications across multiple eSIMs on the eUICC, and 2) provide security services to the applications across the multiple eSIMs.

According to one embodiment, the secure element 302 can include an ISD 310 that is owned and/or managed by a device manufacturer (i.e., the Issuer is the device manufacturer instead of the mobile network operator as in the case of a typical UICC), and an eSIM manager 315 that is configured to manage the plurality of eSIMs (e.g., eSIM-1 320 and eSIM-2 322) of the secure element 302. ISD 310 holds a set of cryptographic keys associated with the device manufacturer that facilitate secure communication with the device manufacturer.

As noted above, each eSIM is an emulation of a typical SIM/USIM and can replicate the architecture of the typical SIM/USIM. In particular, each eSIM can include a security domain associated with a corresponding mobile network operator, a plurality of applications associated with the corresponding mobile network operator, and binary packages associated with the applications. For example, eSIM-1 320 can replicate the architecture of the SIM 104 illustrated in FIG. 1. For example, the eSIM-1 320 includes a RAM application 350 that allows a mobile network operator to remotely manage the applications on the eSIM-1 320, an RFM application 352 that allows the mobile network operator to remotely manage one or more files on eSIM-1 320, one or more network access (NA) applications 354, 356 associated with one or more wireless networks (for example, GSM, UMTS, and/or other networks), one or more proprietary applications 358 associated with the mobile network operator, and one or more third-party applications (for example, transit applications, payment applications, banking applications, etc.) provided by third-party service providers and hosted by the mobile network operator. The eSIM-1 320 can further include binary packages 340, 342, 344/346, and 348 associated with the RAM application, the RFM application, each of the NA applications, and each of the proprietary applications, respectively. The binary packages can include files, directories, and scripts necessary for instantiation of the applications on the secure element 302.

Furthermore, eSIM-1 320 can include a security domain eSIMSD-1 330 associated with a mobile network operator, a CASD 371, and/or a SSD 360. The eSIMSD-1 holds a set of cryptographic keys associated with the mobile network operator that facilitate secure communication with the mobile network operator in order to authenticate with the mobile network operator. In other words, eSIMSD-1 330 replicates the functions of ISD 110 of the typical UICC of FIG. 1 (i.e., eSIMSD-1 330 is owned by the mobile network operator). The credentials/keys associated with the eSIMSD-1 330 are generated on-board using the GlobalPlatform™ framework of security domains. SSD 360 holds a set of cryptographic keys associated with the third-party service provider (that provides third-party applications such as payment application 362 and associated payment binary package 364) that facilitate secure communication with a third-party server, and so on.

Similarly, the eSIM-2 322 can include a RAM application 380 that allows a mobile network operator (for example, a different mobile network operator than the mobile network operator associated with the eSIM-1 320) to remotely manage the applications on the eSIM-2 322, a RFM application 382 that allows the mobile network operator to remotely manage one or more files on eSIM-2 322, an NA application 384 associated with a particular wireless network, and a proprietary application 386 associated with the mobile network operator. The eSIM-2 322 can further include binary packages 370, 372, 374, and 376 associated with the RAM application, the RFM application, the NA application, and the proprietary application, respectively. Furthermore, eSIM-2 322 includes a security domain eSIMSD-2 332 associated with the mobile network operator. The eSIMSD-2 holds a set of cryptographic keys associated with the mobile network operator that facilitate secure communication with the mobile network operator in order to authenticate with the mobile network operator.

Each of the eSIMs (320, 322) or eSIMSDs (330, 332) can be associated with an AID (application identifier specified according to Java Card™ framework). The AID can be implicitly or explicitly set. In one embodiment, the AID of one or more of the eSIMs/eSIMSDs can be implicitly set to the AID of ISD 310. In another embodiment, each eSIM/eSIMSD can be explicitly set with a different unique AID. The eSIM manager 315 selects a particular eSIM (for activation) based on the AID of the eSIM. Other types of identifiers can be used for eSIM selection/activation without departing from the scope of this disclosure. When a user subscribes to a particular mobile network operator, the eSIM associated with the particular mobile network operator is activated (enabling wireless network services associated with the particular mobile network operator to be obtained) while the other eSIMs on the eUICC are deactivated. Subsequently, when a subscription change from the current mobile network operator to a new mobile network operator is desired, the eSIM of the current mobile network operator can be deactivated and the eSIM of the new mobile network operator can be activated, thereby facilitating the subscription change.

Existing infrastructure of mobile network operators enables authentication with typical ISDs (for example, ISD 110) via AIDs (and other elements, such as keys etc.). By associating each eSIM/eSIMSD of FIG. 3 with an AID, it is not necessary to modify the existing infrastructure of mobile network operators. From the perspective of the mobile network operator, authentication for an eSIMSD is performed as if it were a typical ISD (for example, ISD 110).

The architecture of FIG. 3 allows the reuse of RAM, RFM and NA applications across multiple eSIMs. For this reason, it would be redundant and wasteful to store each of the associated binary packages for the RAM, RFM and NA applications on each of the eSIMs. Accordingly, one embodiment involves standardizing the RAM application, the RFM application, and the NA applications such that each eSIM can use the standardized applications and the associated standardized binary packages without having to individually store the binary packages associated with these applications.

Figure 4:
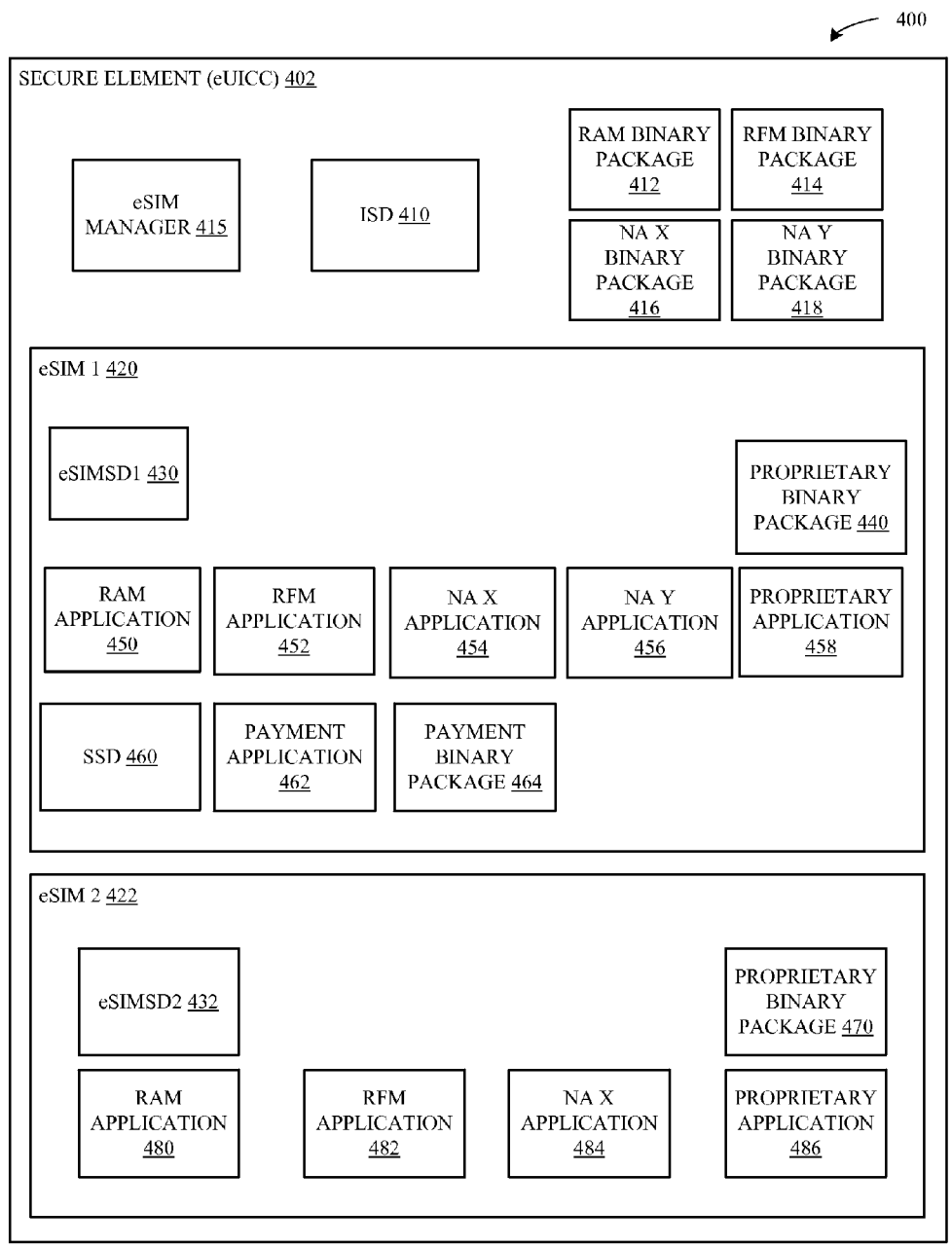

FIG. 4 illustrates an exemplary architecture of secure element 402 that includes standardized RAM, RFM, and NA applications, according to one embodiment. As shown in FIG. 4, binary packages 412, 414, 416 and 418 associated with the respective standardized RAM, RFM, and NA applications are stored in a separate memory space (separate from the eSIMs) within the secure element 402. The separate memory space can be associated with the ISD 410. According to this approach, the storage responsibilities of each eSIM (eSIM-1 420, eSIM-2 422) can be reduced to include binary packages associated with only proprietary applications that the mobile network operator deems necessary for the eSIM to function properly. For example, the eSIM-1 420 can store a proprietary binary package 440 for the proprietary application 458 and the eSIM-2 422 can store a proprietary binary package 470 for the proprietary application 486.

The remaining components of secure element 402 are similar to the corresponding components of secure element 302. In particular, secure element includes ISD 410 associated with a device manufacturer, one or more eSIMs 420, 422, and an eSIM manager 415 configured to manage the eSIMs on the secure element 402. eSIM-1 420 includes RAM application 450, RFM application 452, NA applications 454, 456, proprietary application 458, a security domain eSIMSD-1 430 associated with a mobile network operator, a CASD, and/or a SSD 460. The eSIMSD-1 430 holds a set of cryptographic keys associated with the mobile network operator that facilitate secure communication with the mobile network operator in order to authenticate with the mobile network operator. SSD 460 holds a set of cryptographic keys associated with the third-party service provider (that provides third-party applications such as payment application 462 and associated payment binary package 464) that facilitate secure communication with a third-party server, and so on. Also, eSIM-2 422 includes a RAM application 480 that allows a mobile network operator (for example, a different mobile network operator) to remotely manage the applications on the eSIM-2 422, a RFM application 482 that allows the mobile network operator to remotely manage one or more files on eSIM-2 422, a NA application 484 associated a network, a proprietary application 486 associated with the mobile network operator, and a security domain eSIMSD-2 432 associated with the mobile network operator.

When a particular eSIM is selected/activated, the active eSIM is provided access to the standardized binary packages 412, 414, 416 and 418 associated with the respective standardized RAM, RFM, and NA applications. The ISD 410 and the eSIMSD (associated with the active eSIM) can merge into a single entity (albeit with separate cryptographic keys) such that access to the standardized binary packages can be provided. It is noted that the ISD and eSIMSD are not physically merged but can appear to be merged in order to enable access to the standardized binary packages. In this manner, and from the perspective of the mobile network operator, the eSIMSD operates as if it were the ISD.

Figure 5:
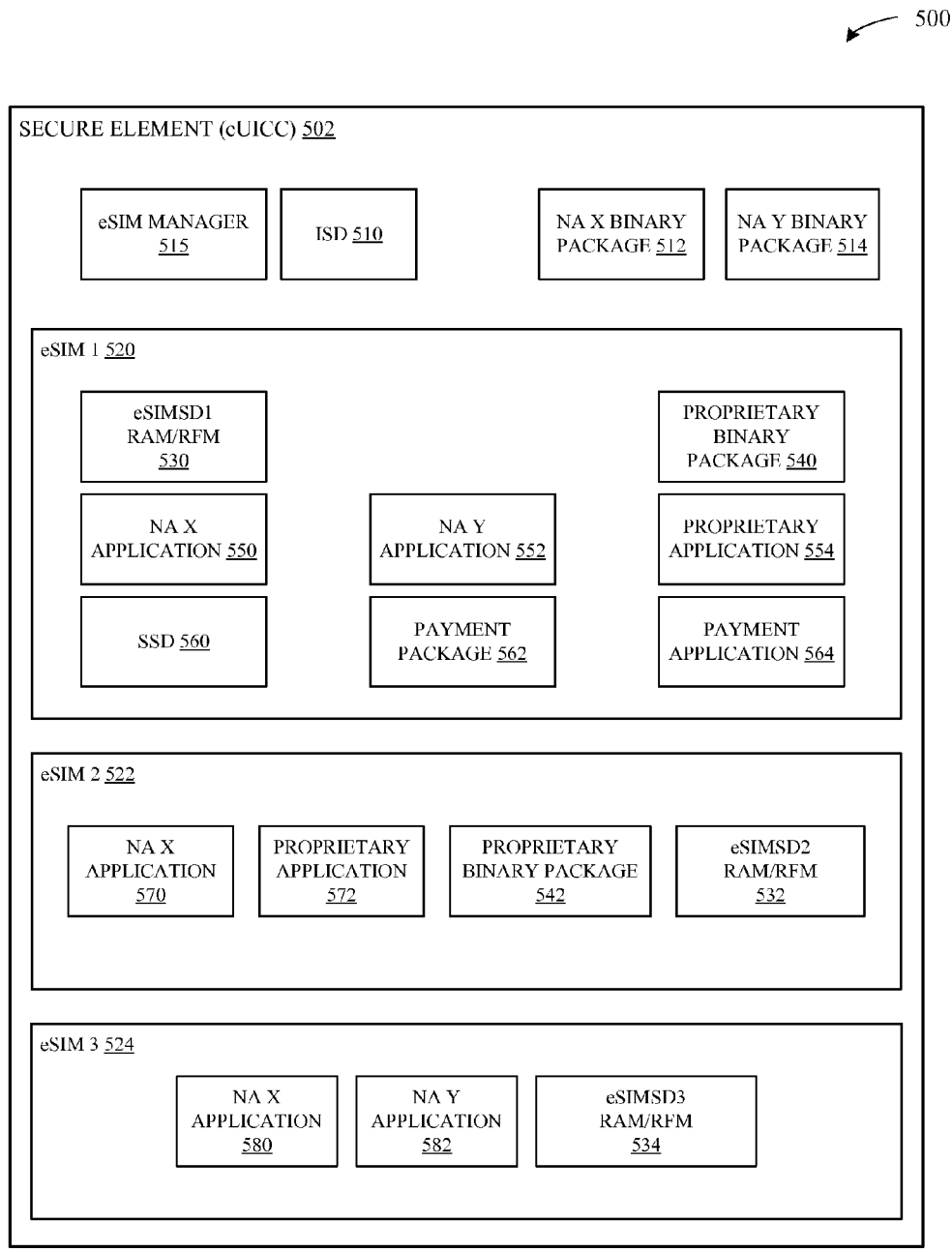

FIG. 5 illustrates an exemplary architecture of secure element 502 that includes standardized NA applications, according to one embodiment. The secure element 502 includes ISD 510 associated with a device manufacturer, a plurality of eSIMs 520, 522, 524, and an eSIM manager 515 configured to manage the eSIMs on the secure element. As shown in FIG. 5, the NA applications can be standardized such that each eSIM can use the standardized applications and the associated standardized binary packages without having to individually store the binary packages associated with these applications. Binary packages 512, 514 associated with the respective NA applications are stored in a separate memory space (separate from the eSIMs) within the secure element 502. The separate memory space can be associated with the ISD 510. One or more of the eSIMs (eSIM-1 520, eSIM-2 522, eSIM-3 524) can include binary packages associated with only proprietary applications that the mobile network operator deems necessary for the eSIM to function properly. For example, eSIM-1 520 can store proprietary binary package 540 for proprietary application 554, and eSIM-2 522 can store proprietary binary package 542 for proprietary application 572. Notably, the eSIM-3 524 does not store a proprietary binary package because the eSIM-3 524 does not include a proprietary application.

In addition to having standardized NA applications and associated binary packages, the functions of the RAM and RFM applications can be merged with the functions of the eSIMSDs in order to incorporate the functions of the RAM and RFM applications within the GlobalPlatform™ Specification framework. This suppresses the need to store binary packages of the RAM and RFM applications on the eUICC. The need to instantiate the RAM and RFM applications on each eSIM is also suppressed, which can reduce the overall size of the eSIMs. As noted above, the security domains are defined by the GlobalPlatform™ Framework. On the other hand, the RAM and RFM applications are defined by the European Telecommunications Standards Institute (ETSI) standard. However, the security mechanisms on which the two entities rely are the same. Therefore, the functions of the RAM and RFM applications can be easily merged with the functions of the eSIMSDs.

As shown in FIG. 5, eSIM-1 520 includes an eSIMSD-1 530 that is merged with RAM/RFM applications. The eSIM-1 520 includes NA applications 550, 552, and proprietary application 554, but does not include instantiations of the RAM/RFM applications. eSIM-1 520 can also include SSD 560. Similarly, eSIM-2 522 includes an eSIMSD-2 532 that is merged with RAM/RFM applications. The eSIM-2 522 includes NA application 570, and proprietary application 572 but does not include instantiations of the RAM/RFM applications. Similarly, eSIM-3 524 includes an eSIMSD-3 534 that is merged with RAM/RFM applications. The eSIM-2 524 includes NA applications 580, 582 but does not include instantiations of the RAM/RFM applications.

When a particular eSIM is selected/activated, the active eSIM is provided access to the standardized binary packages 512 and 514 associated with the respective standardized NA applications. The ISD 510 and the eSIMSD (associated with the active eSIM) can merge into a single entity (albeit with separate cryptographic keys) such that access to the standardized binary packages can be provided.

The exemplary architectures of FIG. 4 and FIG. 5 provide mechanisms for reducing the overall footprint of the eSIMs on the secure element (e.g., by standardizing one or more applications and associated binary packages, and/or by merging the functions of the one or more applications with functions of the security domains). Again, this approach can provide the non-obvious advantage of enabling 1) the eSIMs to be loaded onto the eUICC faster (e.g., when a new subscription is desired), and 2) more eSIMs to be stored on and managed by the eUICC. Furthermore, the architectures described herein are flexible enough to address eUICC requirements while leveraging existing GlobalPlatform™ and other telecommunication standards (e.g., ETSI), which can 1) enable a more seamless transition to the usage of eUICCs, and 2) reduce the development time for vendors to implement eUICCs.

Figure 6:
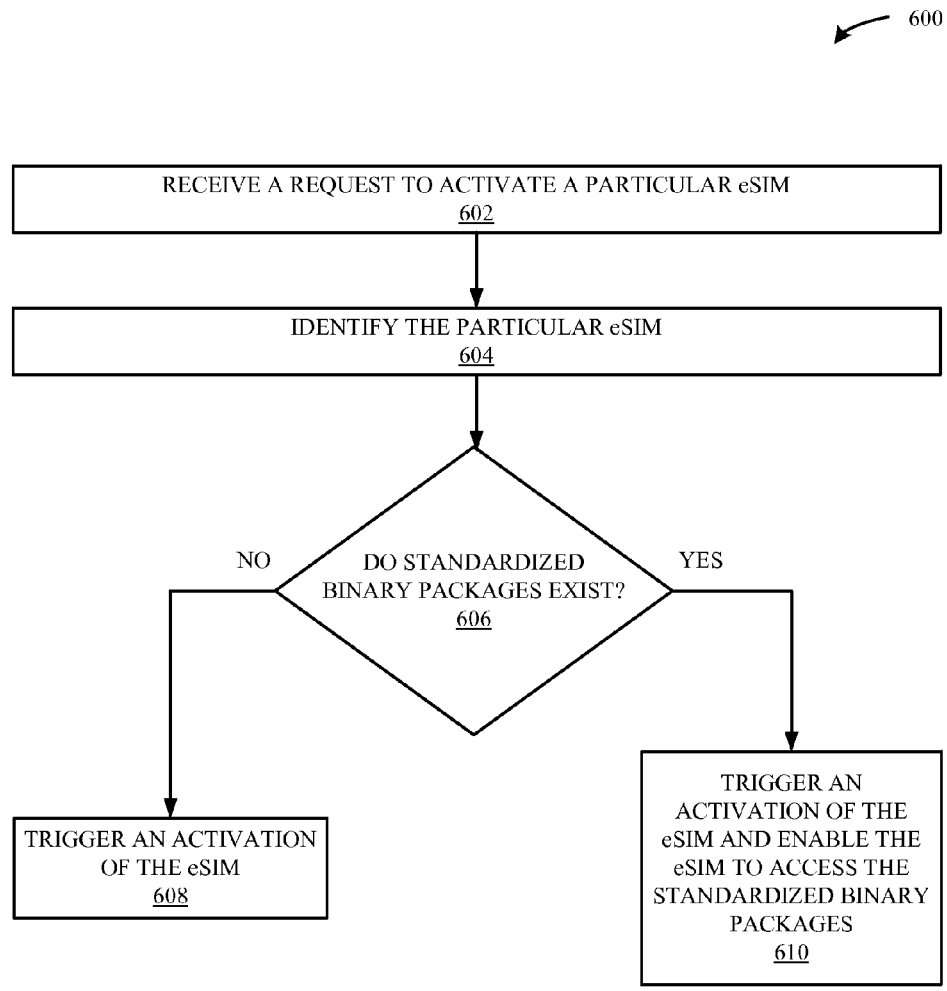
FIG. 6 illustrates a sequence diagram of a method for managing activation of one or more electronic Subscriber Identity Modules on a secure element, according to some embodiments.

FIG. 6 illustrates a sequence diagram of a method 600 for managing an activation of one or more eSIMs on a secure element, according to some embodiments. As shown, the method 600 begins at step 602, where the eSIM manager (e.g., eSIM manager 315 of FIG. 3, eSIM manager 415 of FIG. 4, or eSIM manager 515 of FIG. 5) receives a request to activate a particular eSIM of a plurality of eSIMs on the secure element. The request can include the AID associated with the eSIM that is to be activated. In some implementations, the request can be issued in response to a new subscription with a mobile network operator, a subscription change from a current mobile network operator to a new mobile network operator, user preferences, and/or mobile network operator preferences. In some implementations, prior to the request, the eSIM is received from the corresponding mobile network operator and loaded onto the secure element.

At step 604, eSIM manager can identify the particular SIM that is to be activated (based on the AID, for example) from among the plurality of eSIMs. At step 606, eSIM manager can determine whether one or more standardized binary packages associated with one or more standardized applications exist on the secure element. In response to a determination that standardized binary packages do not exist (for example, in the architecture of FIG. 3), eSIM manager triggers the activation of the particular eSIM, at step 608. In some implementations, the activation of the eSIM involves authenticating the eSIM with the corresponding mobile network operator in order to obtain wireless network services provided by the mobile network operator. In response to a determination that standardized binary packages do exist (for example, in the architectures of FIGS. 4 and 5), eSIM manager triggers an activation of the eSIM and enables the eSIM to access the standardized binary packages, at step 610. The eSIM can then authenticate with the corresponding mobile network operator in order to obtain wireless network services provided by the mobile network operator.

Figure 7:
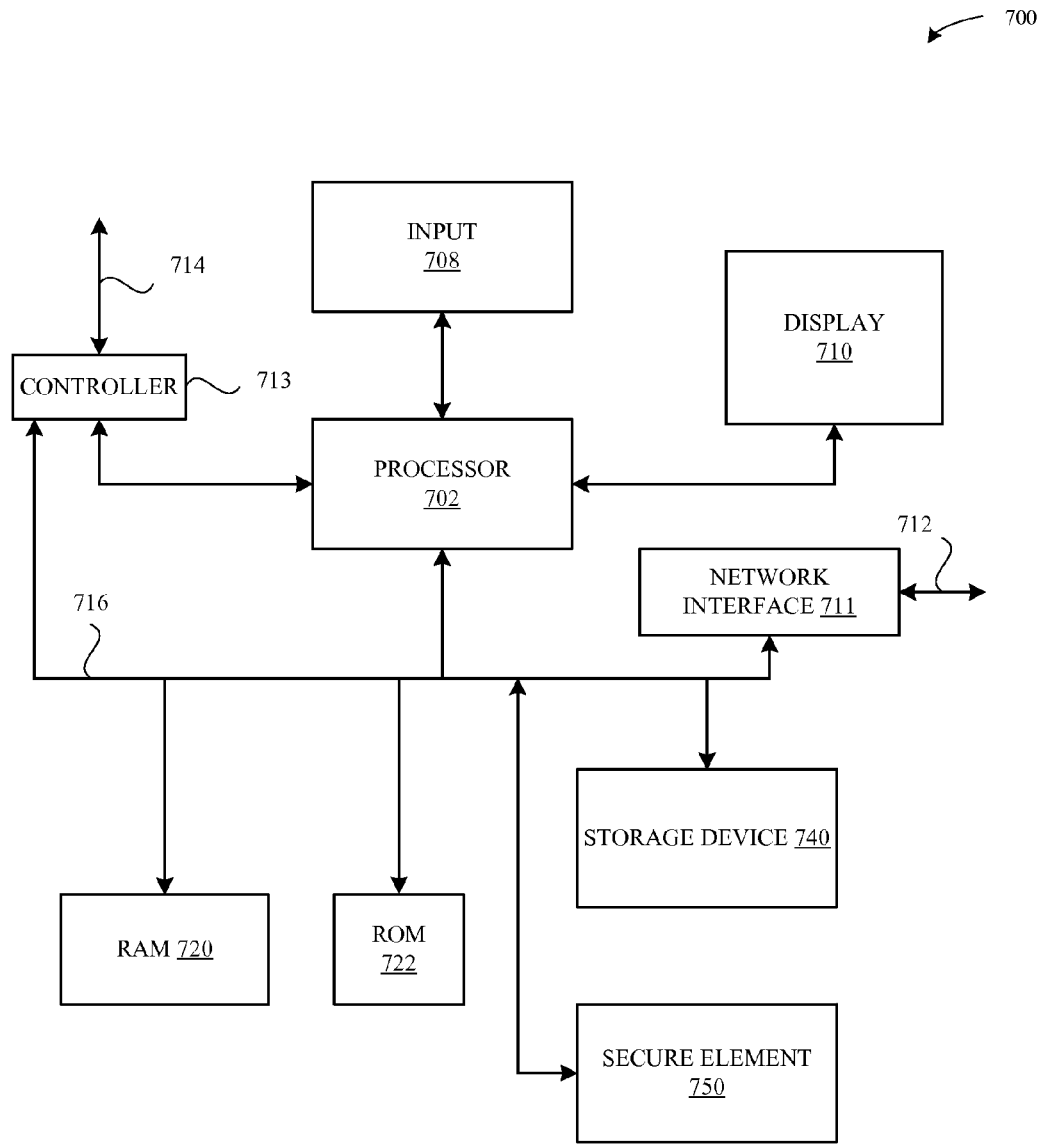
FIG. 7 illustrates a detailed view of a computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the UE 200 illustrated in FIG. 2. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a plurality of wireless interfaces (e.g., transceivers) to connect with a plurality of communication networks associated with a plurality of mobile network operators.

The computing device 700 also include a storage device 740, which can include a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the UE 200. When the computing device 700 represents a UE 200, the computing device 700 includes a secure element 750, which can represent the secure element 302, 402, 502 illustrated in FIGS. 3-5 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A mobile device, comprising:
wireless circuitry; and
a secure element, configured to store:
an Issuer Security Domain (ISD) associated with an Issuer, wherein the Issuer is a mobile device manufacturer,
a plurality of electronic Subscriber Identity Modules (eSIMs),
wherein: i) a first eSIM of the plurality of eSIMs comprises a first instance of a standardized application, ii) the first eSIM is associated with a first mobile network operator (MNO), iii) a second eSIM of the plurality of eSIMs comprises a second instance of the standardized application, and iv) the second eSIM is associated with a second MNO,
a standardized binary package associated with the standardized application,
a software entity configured to manage the plurality of eSIMs, wherein the secure element comprises a processor that causes the software entity to:
receive a request to activate the first eSIM or the second eSIM,
determine whether a standardized binary package exists on the secure element,
in response to a determination that the standardized binary package exists on the secure element:
i) trigger an activation of the first eSIM or the second eSIM, and
ii) enable the activated first eSIM or the activated second eSIM to access the standardized binary package, wherein the standardized binary package is stored separately from the first eSIM and separately from the second eSIM, and
in response to a determination that the standardized binary package does not exist on the secure element:
trigger an activation of the first eSIM or of the second eSIM.

2. The mobile device of claim 1, wherein the first eSIM comprises:
one or more applications associated with the Issuer.

3. The mobile device of claim 1, wherein the first eSIM comprises a standardized remote application management (RAM) application and a standardized remote file management (RFM) application.

4. The mobile device of claim 1, wherein the first eSIM comprises a proprietary application and a binary package associated with only the proprietary application.

5. The mobile device of claim 1, wherein the standardized binary package comprises files, directories, and/or scripts necessary for instantiation of a first application on the secure element.

6. The mobile device of claim 1, wherein: i) the standardized binary package is a remote application management (RAM) binary package, and ii) the standardized application is a RAM application.

7. The mobile device of claim 1, wherein: i) the standardized binary package is a network access (NA) binary package, and ii) the standardized application is a NA application.

8. The mobile device of claim 7, wherein the NA binary package comprises a set of cryptographic keys.

9. The mobile device of claim 7, wherein the standardized binary package comprises a set of cryptographic keys associated with a service provider to facilitate communication with a server of the service provider.

10. The mobile device of claim 9, wherein the service provider is associated with a payment application.

11. A secure element, comprising:
  an Issuer Security Domain (ISD) associated with an Issuer;
  a first storage portion storing a plurality of electronic Subscriber Identity Modules (eSIMs), wherein: i) the plurality of eSIMs comprises a first eSIM associated with a first mobile network operator (MNO), and ii) a second eSIM associated with a second MNO;
  a second storage portion storing a standardized binary package associated with a standardized application, wherein the first storage portion is logically separated from the second storage portion; and
  a software entity configured to manage the plurality of eSIMs, wherein the secure element comprises a processor that causes the software entity to:
    receive a request to activate the first eSIM or the second eSIM,
    determine whether a standardized binary package exists on the secure element,
    in response to a determination that the standardized binary package exists on the secure element:
      i) trigger an activation of the first eSIM or the second eSIM, and
      ii) enable the activated first eSIM or the activated second eSIM to access the standardized binary package, and
    in response to a determination that the standardized binary package does not exist on the secure element:
      trigger an activation of the first eSIM or of the second eSIM.

12. The secure element of claim 11, wherein the standardized binary package is associated with a standardized remote application management (RAM) application, a standardized remote file management (RFM) application, or a standardized network access (NA) application.

13. The secure element of claim 11, wherein the first eSIM comprises a proprietary application and stores a binary package associated with only the proprietary application.

14. The secure element of claim 11, wherein the Issuer is a device manufacturer.

15. The secure element of claim 11, wherein the second storage portion is associated with the ISD.

16. The secure element of claim 11, wherein the standardized binary package comprises files, directories, and/or scripts necessary for instantiation of a first application on the secure element.

17. The secure element of claim 11, wherein: i) the standardized binary package is a remote application management (RAM) binary package, and ii) the standardized application is a RAM application.

18. The secure element of claim 11, wherein: i) the standardized binary package is a network access (NA) binary package, and ii) the NA binary package comprises a set of cryptographic keys associated with a service provider to facilitate communication with a server of the service provider.

19. A method for managing a plurality of electronic Subscriber Identity Modules (eSIMs) stored on a secure element, wherein: i) the plurality of eSIMs comprises a first eSIM associated with a first mobile network operator (MNO), and ii) a second eSIM associated with a second MNO, the method comprising:
  receiving a request to activate the first eSIM or the second eSIM;
  determining whether a standardized binary package exists on the secure element, wherein the standardized binary package is stored separately from the first eSIM and separately from the second eSIM;
  in response to a determination that the standardized binary package exists on the secure element:
    i) triggering an activation of the first eSIM or of the second eSIM, and
    ii) enabling the activated first eSIM or the activated second eSIM to access the standardized binary package; and
  in response to a determination that the standardized binary package does not exist on the secure element:
    triggering an activation of the first eSIM or of the second eSIM.

20. The method of claim 19, wherein the standardized binary package is associated with a standardized remote application management (RAM) application, a standardized remote file management (RFM) application, or a standardized network access (NA) application.

* * * * *